US012738840B2

(12) United States Patent
Concklin

(10) Patent No.: US 12,738,840 B2
(45) Date of Patent: Sep. 15, 2026

(54) FLYING CAPACITOR BALANCING FOR MULTI-LEVEL VOLTAGE CONVERTER

(71) Applicant: Renesas Electronics America Inc., Milpitas, CA (US)

(72) Inventor: Barry John Concklin, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 394 days.

(21) Appl. No.: 18/320,014

(22) Filed: May 18, 2023

(65) Prior Publication Data

US 2024/0388202 A1 Nov. 21, 2024

(51) Int. Cl.

| | |
|---|---|
| ***H02M 3/07*** | (2006.01) |
| ***H02M 1/00*** | (2006.01) |
| ***H02M 1/088*** | (2006.01) |
| ***H02M 7/483*** | (2007.01) |
| *H02M 1/32* | (2007.01) |

(52) U.S. Cl.

CPC ........... *H02M 3/07* (2013.01); *H02M 1/0095* (2021.05); *H02M 1/088* (2013.01); *H02M 7/4837* (2021.05); *H02M 1/32* (2013.01)

(58) Field of Classification Search

CPC .... H02M 3/07; H02M 1/0095; H02M 7/4837; H02M 1/32; H02M 1/088

See application file for complete search history.

(56) References Cited

U.S. PATENT DOCUMENTS

| | | | | |
|---|---|---|---|---|
| 10,468,978 | B2 * | 11/2019 | Zhang | H02M 3/073 |
| 12,143,004 | B2 * | 11/2024 | Wu | H02M 1/088 |
| 2023/0336078 | A1 * | 10/2023 | Bertolini | H02M 3/07 |
| 2024/0250609 | A1 * | 7/2024 | Concklin | H02M 1/36 |

* cited by examiner

*Primary Examiner* — Crystal L Hammond
*Assistant Examiner* — Jonathan Walter Soileau
(74) *Attorney, Agent, or Firm* — SCULLY, SCOTT, MURPHY & PRESSER, P.C.

(57) ABSTRACT

Apparatuses, devices, and methods for operating a multi-level voltage converter are described. A circuit can, in response to a completion of a state of the multi-level voltage converter, output an indication that indicates whether a voltage of a flying capacitor in a multi-level voltage converter reaches a reference voltage or fails to reach the reference voltage. The completed state can be one of a charge state and a discharge state. A controller can, in response to the indication indicating the voltage of the flying capacitor fails to reach the reference voltage, repeat the completed state to operate the multi-level voltage converter.

20 Claims, 6 Drawing Sheets

FLYING CAPACITOR BALANCING FOR MULTI-LEVEL VOLTAGE CONVERTER

BACKGROUND

The present disclosure relates in general to semiconductor devices. More specifically, the present disclosure relates to balancing a flying capacitor in multi-level voltage converters during operations.

Voltage converters, such as buck converters and boost converters, can be used for converting an input voltage to an output voltage having a different voltage level. A buck converter, or step-down converter, can be used in applications where there is a need to decrease a direct current (DC) voltage. The buck converter can receive an input voltage and provide a stepped-down output voltage. A boost converter, or step-up converter, can be used in applications where there is a need to increase a DC voltage. The boost converter can receive an input voltage and provide a stepped-up output voltage. A voltage converter can include multiple switches at an input of the voltage converter, where the switches can be turned on and off by a pulse width modulated (PWM) control signal. A duty cycle of the PWM control signal can determine an output voltage of the voltage converter. As the switches turn on and off, they modulate a DC input voltage and the modulated voltage can be provided to an inductor. The inductor can be connected to a capacitor and the modulated voltage can be a time-varying voltage that causes the inductor to create a time-varying current. The interaction of the inductor and capacitor with the time-varying voltage and current can produce a nearly constant output voltage that has a different DC level than the input voltage.

A voltage converter with two switches can switch the inductor between two voltages-the input voltage and ground. A multi-level voltage converter can include more than two switches and can switch the inductor among more than two voltages-the input voltage, at least one intermediate voltage between the input voltage and ground, and ground. For example, a three-level voltage converter can include four switches and can switch the inductor among three voltages-the input voltage, a mid-voltage equivalent to half the input voltage, and ground. Multi-level voltage converters include at least one flying capacitor that is switched between two states-a charging state and a discharging state.

SUMMARY

In one embodiment, a semiconductor is generally described. The semiconductor device can include a circuit and a controller. The circuit can be configured to, in response to a completion of a state of the multi-level voltage converter, output an indication that indicates whether a voltage of a flying capacitor in a multi-level voltage converter reaches a reference voltage or fails to reach the reference voltage. The completed state can be one of a charge state and a discharge state. The controller can be configured to, in response to the indication indicating the voltage of the flying capacitor fails to reach the reference voltage, repeat the completed state to operate the multi-level voltage converter.

In one embodiment, a system is generally described. The system can include a multi-level voltage converter and a controller. The multi-level voltage converter can include a flying capacitor. The controller can be configured to in response to a completion of a state of the multi-level voltage converter, determine whether a voltage of a flying capacitor in a multi-level voltage converter reaches a reference voltage or fails to reach the reference voltage. The completed state can be one of a charge state and a discharge state. The controller can be further configured to, in response to a determination that the flying capacitor fails to reach the reference voltage, repeat the completed state to operate the multi-level voltage converter.

In one embodiment, a method for operating a multi-level voltage converter is generally described. The method can include operating a multi-level voltage converter under a predefined sequence of states that includes at least one charge state and at least one discharge state. The method can further include, in response to a completion of a state of the multi-level voltage converter, determining that a voltage of a flying capacitor in the multi-level voltage converter fails to reach a reference voltage. The completed state can be one of a charge state and a discharge state. The method can further include, in response to determining that the voltage of the flying capacitor fails to reach the reference voltage, repeating the completed state to operate the multi-level voltage converter. The repeat of the completed state can depart from the predefined sequence of states.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1A:
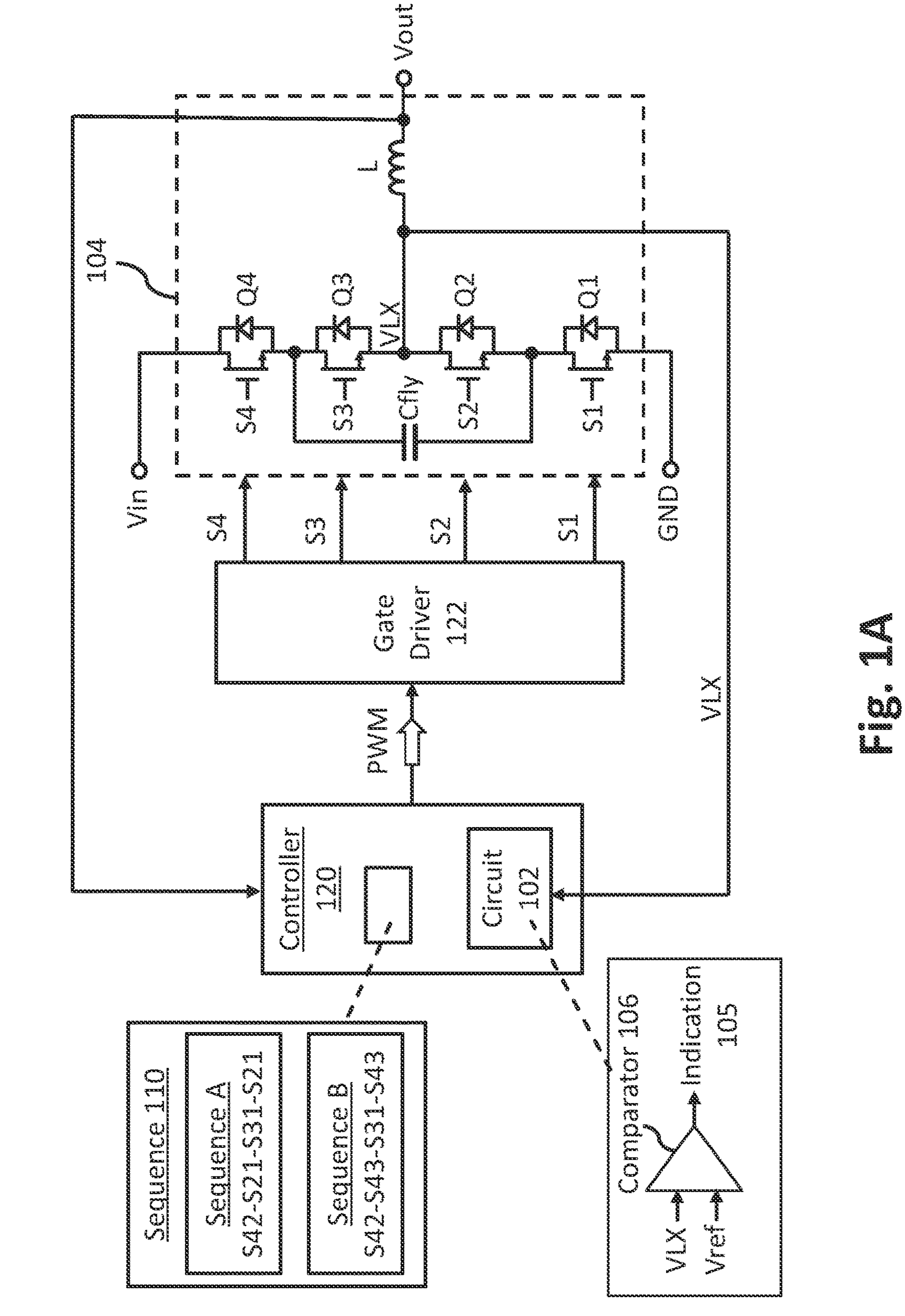
FIG. 1A is an example diagram of an apparatus that includes flying capacitor balancing for multi-level voltage converters in one embodiment.

FIG. 1A is an example diagram of an apparatus that includes flying capacitor balancing for multi-level voltage converters, such as a three-level buck converter, in one embodiment. An apparatus 100 is shown in FIG. 1A. Apparatus 100 can be, for example, a semiconductor device implementing a volage regulator that receives an input voltage Vin and output an output voltage Vout. Apparatus 100 can include a controller 120, a gate driver 122, a circuit 102 and a multi-level voltage converter 104, where multi-level voltage converter 104 can be a three-level buck converter. Multi-level voltage converter 104 can include four transistors Q1, Q2, Q3, Q4, an inductor L, and a flying capacitor Cfly. In the embodiment shown in FIG. 1A, circuit 102 can be a logic circuit embedded or integrated as a part of controller 120. In another embodiment (not shown), circuit 102 can be a standalone circuit or hardware component separated from controller 120 and gate driver 122. Transistors Q1, Q4 can be referred to as the outer transistors, and transistors Q2, Q3 can be referred to as inner transistors.

In some embodiments, circuit 102 can also be implemented for apparatuses and systems that include multi-level boost converters, multi-level buck converters, or multi-level buck-boost converters. Multi-level voltage converters can include, but not limited to, three-level buck, boost, or buck-boost converters, four-level buck, boost, or buck-boost converters, or other multi-level voltage converters configured to output at least three voltages. In some embodiments, more than one piece of circuit 102 can be implemented for apparatuses and systems that includes multi-level voltage converters with multiple (e.g., more than one) flying capacitors. By way of example, for a N-level voltage converter, there are N-2 flying capacitors and N-2 pieces of circuit 102 that can control each flying capacitor independently.

Controller 120 can be configured to provide one or more pulse width modulation (PWM) signals to gate driver 122. Gate driver 122 can be configured to drive transistors Q1, Q2, Q3, Q4 by generating and providing the first and second complementary signals that include signals S1. S2, S3, S4. Generation of the signals S1, S2, S3, S4 can be based on the PWM signals provided by controller 120. Controller 120 can be configured to switch transistors Q1, Q2, Q3, Q4 according to one or more predefined sequences of states in order to generate a desired voltage level and output the desired voltage level as output voltage Vout. In the embodiment shown in FIG. 1A, controller 120 can switch transistors Q1, Q2, Q3, Q4 according to a set of predefined sequence 110 that includes at least a sequence A and a sequence B.

In an aspect, for a three-level voltage converter (as shown in FIG. 1A) the desired voltage level to be outputted as Vout can include Vin, zero volt (OV), and Vin/2. Controller 120 can switch transistors Q1, Q2, Q3, Q4 according to sequence A or sequence B to output either Vin, OV, or Vin/2 at a switch node VLX between inner transistors Q2, Q3. Voltage at switch node VLX can be output voltage Vout. Controller 120 can determine whether to switch transistors Q1, Q2, Q3, Q4 according to sequence A or sequence B based on a voltage level of Vout being measured at an output of multi-level voltage converter 104. By way of example, if Vout is less than half of Vin, controller 120 can switch transistors Q1, Q2, Q3, Q4 according to sequence A. If Vout is greater than half of Vin, or greater than Vin/2, controller 120 can switch transistors Q1, Q2, Q3, Q4 according to sequence B.

Controller 120 can switch transistors Q1, Q2, Q3, Q4 according to sequence A to alternately generate OV and Vin/2 at VLX. By varying the relative on-time of the states, any voltage between OV and Vin/2 can be generated as output voltage Vout. Sequence A can be a predefined sequence of state S42, state S21, state S31, state S21. State S42 is a state where Q4 and Q2 are switched on and Q3 and Q1 are switched off. State S21 is a state where Q2 and Q1 are switched on and Q4 and Q3 are switched off. State S31 is a state where Q3 and Q1 are switched on and Q4 and Q2 are switched off. When Vout is less than Vin/2, under state S42, both inductor current on inductor L (at output of multi-level voltage converter 104) and a voltage of Cfly ("flying capacitor voltage $V_{Cfly}$") can increase, hence state S42 charges flying capacitor Cfly and state S42 can be referred to as a charge state. Under state S21, inductor current on inductor L can decrease and $V_{Cfly}$ can be maintained at a fixed level. Under state S31, flying capacitor Cfly is discharged while inductor current on inductor L increases, hence state S31 can be referred to as a discharge state.

Controller 120 can switch transistors Q1, Q2, Q3, Q4 according to sequence B to alternately generate Vin and Vin/2 at VLX. By varying the relative on-time of the states, any voltage between Vin/2 and Vin can be generated as output voltage Vout. Sequence B can be a predefined sequence of state S42, state S43, state S31, state S43. State S43 is a state where Q4 and Q3 are switched on and Q2 and Q1 are switched off. Under state S43, inductor current on inductor L increases and voltage at VLX is equivalent to Vin (VLX=Vin).

Note that under charge state S42, switch voltage at VLX is equivalent to a difference between Vin and $V_{Cfly}$ (VLX=Vin-$V_{Cfly}$). Under discharge state S31, switch voltage at VLX is equivalent to $V_{Cfly}$ (VLX=$V_{Cfly}$). Therefore, if $V_{Cfly}$ is maintained at Vin/2, multi-level voltage converter 104 can output Vin/2 during state S42 and state S31. Further, VLX is equivalent to ground (GND) under state S21, and equivalent to Vin under state S43. Hence, multi-level voltage converter 104 can output 0V during state S21 and output Vin during state S43. If the time spent in charge state S42 and the time spent in discharge state S31 are equivalent then $V_{Cfly}$ can be maintained at a desired value, such as Vin/2. By maintaining the flying capacitor voltage at Vin/2,and switching Q1, Q2, Q3, Q4 based on Vout and sequence 110, voltage at switch node VLX and Vout can alternate between Vin, Vin/2, and ground (GND).

In an aspect, various factors can cause $V_{Cfly}$ to deviate from Vin/2 despite the time duration of the charge and discharge states being identical. These factors can include, but not limited to, hardware nonidealities and temperature and process variations. Conventional techniques to address the deviation of $V_{Cfly}$ can include, for example, adjusting time durations of the charge and discharge states. For example, $V_{Cfly}$ can be increased by increasing the time duration of charge state (e.g., state S42) or decreasing the time duration of the discharge state (e.g., state S31), and $V_{Cfly}$ can be decreased by decreasing the time duration of charge state (e.g., state S42) or increasing the time duration of the discharge state (e.g., state S31). However, techniques to adjust time duration of charge and discharge states can be relatively slow since controller 120 needs to calculate the instantaneous $V_{Cfly}$ deviation, calculate the time adjustment needed, and adjust the duty cycles of the PWM signal for gate driver 122 to switch Q1, Q2, Q3, Q4.

To address deviations in $V_{Cfly}$, controller 120 can use circuit 102 to adjust $V_{Cfly}$ without calculating the deviation and time adjustments, and without adjusting duty cycle for the PWM signal. As controller switches Q1, Q2, Q3, Q4 under a predefined sequence among sequence 110, at the end of each completed charge state or discharge state, controller 120 can use circuit 102 to determine whether to continue the predefined sequence or to depart from the predefined sequence. In response to determining to depart from the predefined sequence, controller 120 can insert an extra charge state to further charge Cfly, or to insert an extra discharge state to further discharge Cfly.

In one embodiment shown in FIG. 1A, circuit 102 can be configured to monitor $V_{Cfly}$ by monitoring the switch node voltage VLX. In the embodiment shown in FIG. 1A, circuit 102 can measure switch node voltage VLX and compare the measured VLX with a reference voltage Vref. Circuit 102 can output an indication 105 (or an indication signal 105) that indicates whether VLX is greater than or less than Vref. In one embodiment, circuit 102 can include a comparator 106 configured to compare VLX with Vref and output indication 105, where comparator 106 can be a latched comparator. In one embodiment Vref can be set to a desired value of $V_{Cfly}$. For example, in a three-level voltage converter, $V_{Cfly}$ needs to be maintained at Vin/2 and thus, Vref can be set to Vin/2. Circuit 102 can output an indication 105 that indicates whether VLX is greater than or less than Vref.

Figure 1B:
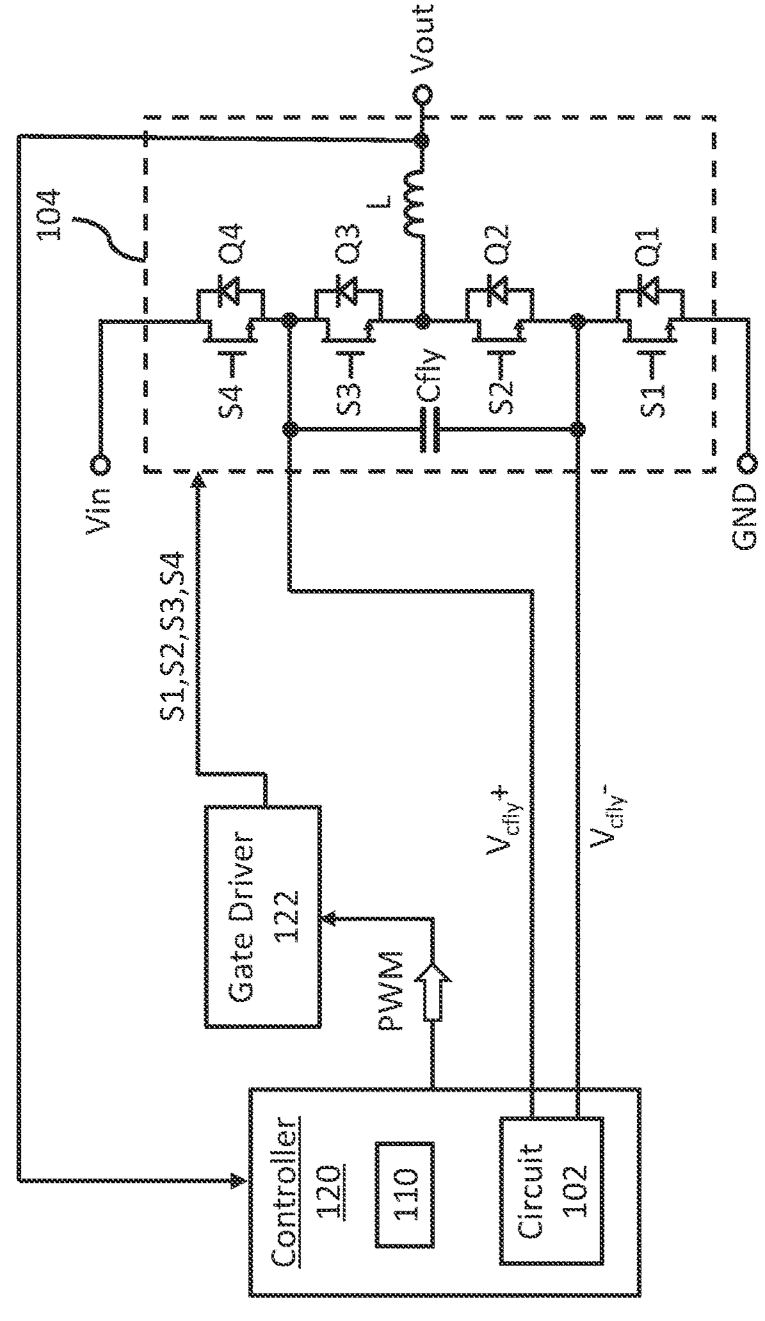
FIG. 1B is an example diagram of another apparatus that includes flying capacitor balancing for multi-level voltage converters in one embodiment.
Figure 4:
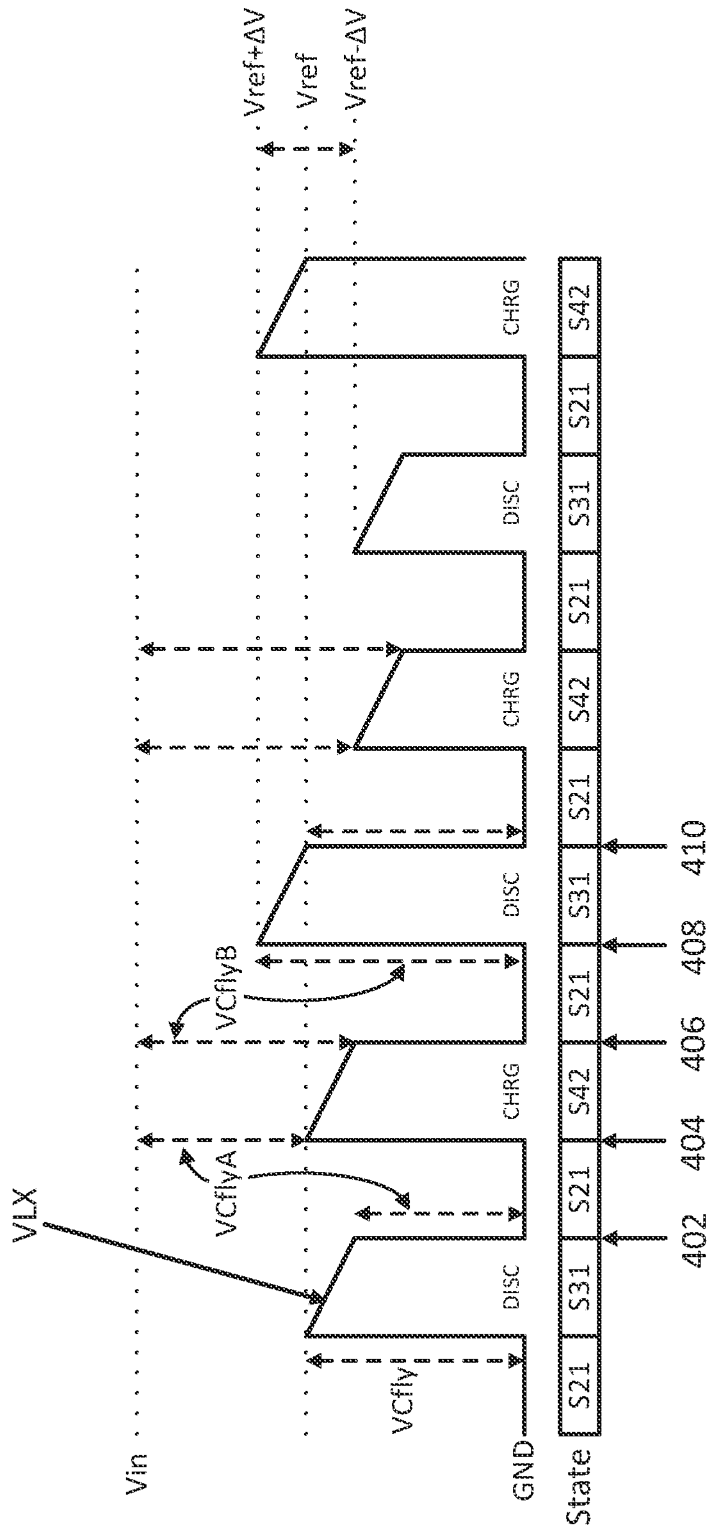
FIG. 4 is an example diagram illustrating a condition for implementing flying capacitor balancing for multi-level voltage converters in one embodiment.

In one embodiment shown in FIG. 1B, circuit 102 can be configured to monitor $V_{Cfly}$ by measuring a differential voltage $V_{Cfly}$+ and $V_{Cfly}$− across flying capacitor Cfly and comparing the measured differential voltage with reference voltage Vref. In one embodiment, circuit 102 shown in FIG. 1B can include a window comparator that compares the measured differential voltage with an upper bound value and a lower bound value. The upper bound value can be a sum of Vref and a voltage offset (e.g., Vref+voltage offset) and the lower bound value can be a difference between Vref and the voltage offset (e.g., Vref−voltage offset). The voltage offset is also shown in FIG. 4 as ΔV. Indication 105 outputted by circuit 102 that includes the window comparator can indicate whether the measured differential voltage is within a window defined by the upper bound value and the lower bound value.

Controller 120 can read indication 105 and determine whether to continue with the predefined sequence or to depart from the predefined sequence. If indication 105 indicates VLX is greater than Vref after completing a discharge state, controller 120 can depart from the predefined sequence and insert another discharge state to further discharge Cfly. If indication 105 indicates VLX is greater than Vref after completing a charge state, controller 120 can depart from the predefined sequence and insert another charge state to further charge Cfly.

Based on indication 105 outputted by circuit 102, controller 120 can maintain $V_{Cfly}$ at a desired voltage without the need to calculate $V_{Cfly}$ deviations and timing adjustments. Therefore, controller 120 can use circuit 102 to perform flying capacitor balancing in a relatively fast approach when compared with conventional timing adjustment techniques. Further, circuit 102 can be implemented by digital logic circuits without modifications to analog hardware in controller 120, thus it can be relatively simple to implement circuit 102 in various different modulation architectures.

Figure 2:
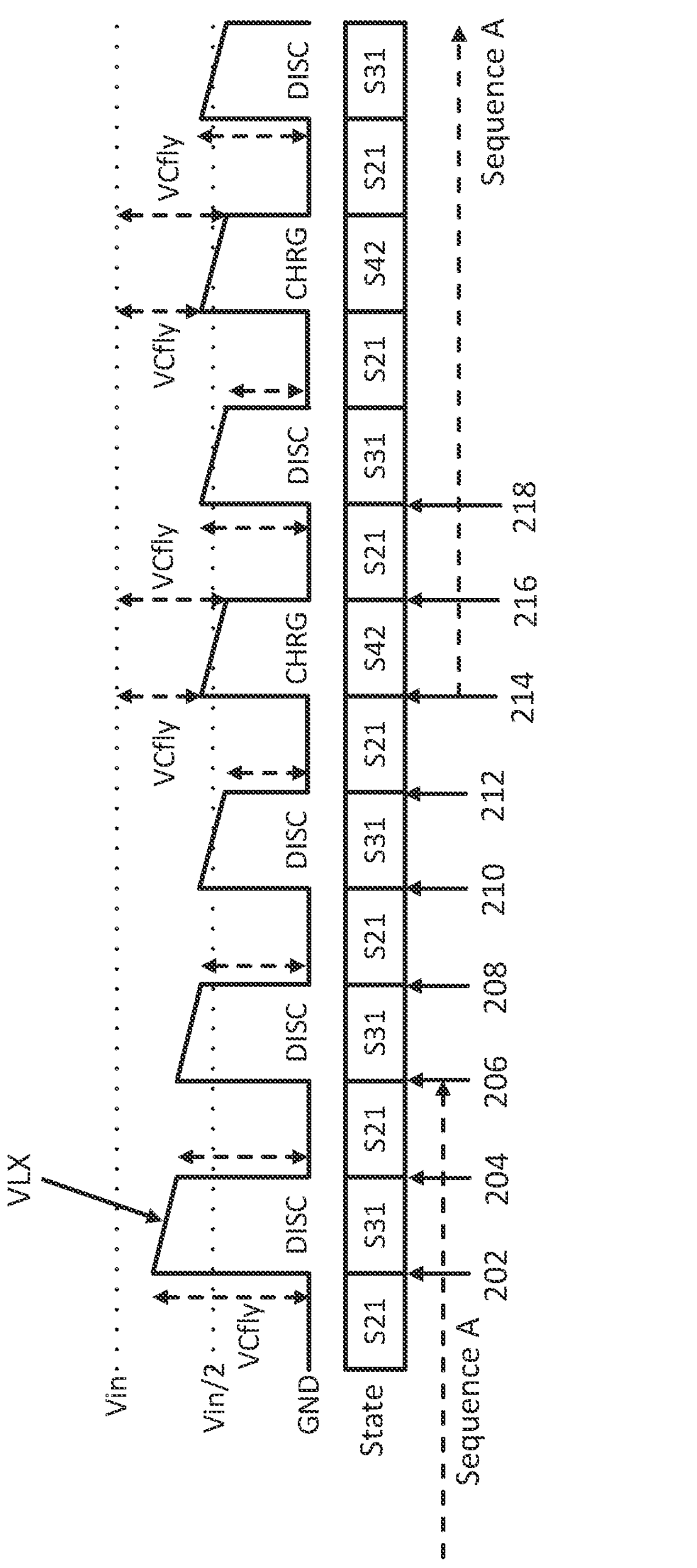
FIG. 2 is an example diagram illustrating an example implementation of flying capacitor balancing for multi-level voltage converters in one embodiment.

FIG. 2 is an example diagram illustrating an example implementation of flying capacitor balancing for multi-level voltage converters in one embodiment. In an example shown in FIG. 2, switch node voltage VLX of apparatus 100 can vary according different states, and different sequences, of Q1, Q2, Q3, Q4 (see FIG. 1A and FIG. 1B). The example shown in FIG. 2 is an example where controller 120 is operating Q1, Q2, Q3, Q4 under sequence A that has a repetitive sequence of states S42, S21, S31, S21.

In the example shown in FIG. 2, at a time 202, VLX can be at a voltage level between Vin/2 and Vin, hence VLX is greater than Vin/2 at time 202. A discharge state, or state S31, can begin at time 202 and complete at a time 204. In response to completing state S31 at time 204, although VLX is reduced to a lower voltage level when compared to VLX at time 202, but VLX remains greater than Vin/2 at time 204. Note that in the discharge state S31, VLX is equivalent to $V_{Cfly}$, hence $V_{Cfly}$ is greater than Vin/2 at time 204. In response to completion of state S31 at time 204, circuit 102 in FIG. 1A can measure VLX at time 204 and compare the measured VLX with reference voltage Vref (see FIG. 1A). In one embodiment, Vref can be set to a desired voltage of a flying capacitor. For example, if VLX is a switch node voltage of a three-level voltage converter, Vref is set to Vin/2.

At time 204, the comparison of VLX with reference voltage Vref can result in indication 105 (see FIG. 1A) indicating VLX is greater than Vref, or Vin/2. Controller 120 can read indication 105 and in response to VLX being greater than Vref, depart from sequence A and insert another discharge state S31 that begins at a time 206. Note that at time 204, VLX is equivalent to $V_{Cfly}$, hence $V_{Cfly}$ is also greater than Vin/2 and needs to be further discharged for $V_{Cfly}$ to reach Vin/2. Under sequence A, a charge state S42 would have begun at time 206 but since indication 105 outputted from circuit 102 indicates VLX is greater than Vref, controller 120 departs from sequence A and inserts discharge state S31 at time 206 to further discharge Cfly.

The discharge state S31 that began at time 206 can complete at a time 208. At time 208, the comparison of VLX with reference voltage Vref can result in indication 105 indicating VLX is still greater than Vref, or Vin/2. Controller 120 can read indication 105 and in response to VLX being greater than Vref, depart from sequence A and insert another discharge state S31 that begins at a time 210. Note that at time 208. VLX is equivalent to $V_{Cfly}$, hence $V_{Cfly}$ is also greater than Vin/2 and needs to be further discharged for $V_{Cfly}$ to reach Vin/2. Under sequence A, a charge state S42 would have begun at time 210 but since indication 105 outputted from circuit 102 indicates VLX is greater than Vref, controller 120 departs from sequence A and insert another discharge state S31 at time 210 to further discharge Cfly.

The discharge state S31 that began at time 210 can complete at a time 212. At time 212, the comparison of VLX with reference voltage Vref can result in indication 105 indicating VLX is less than Vref, or Vin/2. Note that at time 212, VLX is equivalent to $V_{Cfly}$, hence $V_{Cfly}$ is also less than Vin/2 and needs to be charged for $V_{Cfly}$ to reach Vin/2. Controller 120 can read indication 105 and in response to VLX being less than Vref, insert a charge state S42 that begins at a time 214 to charge Cfly. The charge state S42 that began at time 214 can complete at a time 216. Note that in the charge state S42, VLX is equivalent to Vin-$V_{Cfly}$, thus as the charge state S42 progress from time 214 to time 216, VLX can decrease and $V_{Cfly}$ can increase. At time 216, the comparison of VLX with reference voltage Vref can result in indication 105 indicating VLX is less than Vref, or Vin/2. At time 216, VLX is equivalent to Vin-$V_{Cfly}$, hence $V_{Cfly}$ is greater than Vin/2 and needs to be discharged for $V_{Cfly}$ to reach Vin/2. Controller 120 can read indication 105 and in response to VLX being less than Vref, perform a discharge state S31 that begins at a time 218 to discharge Cfly.

Therefore, if VLX is greater than Vref after completing a discharge state, controller 120 can insert discharge state S31 to further discharge Cfly. If VLX is greater than Vref after completing a charge state, controller 120 can insert charge state S42 to further charge Cfly. If VLX is less than Vref after completing a discharge state, controller 120 can insert charge state S42 to charge Cfly. If VLX is less than Vref after completing a charge state, controller 120 can insert discharge state S31 to discharge Cfly.

Circuit 102 can continue to monitor and compare VLX with Vref at completion of every charge state S42 and every discharge state S31. In the example shown in FIG. 2, controller 120 departs from sequence A at time 206 and resume sequence A at time 214. Further, the time intervals or time durations of each charge and discharge state are identical and remain unchanged. Thus, $V_{Cfly}$ can be maintained or balanced by having controller 120 insert charge or discharge states, instead of having to perform calculations of timing offsets and adjusting PWM signals to modify charge state or discharge state durations.

Figure 3:
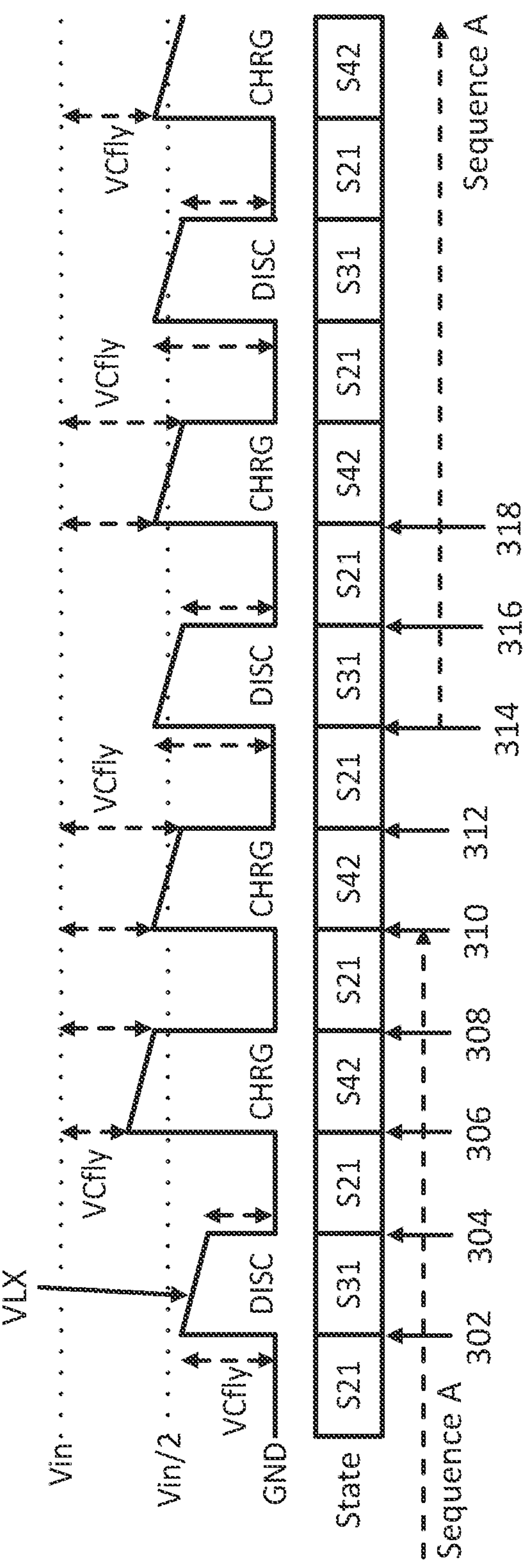
FIG. 3 is an example diagram illustrating another example of the implementation shown in FIG. 2 in one embodiment.

FIG. 3 is an example diagram illustrating another example of the implementation shown in FIG. 2 in one embodiment. In an example shown in FIG. 3, switch node voltage VLX of apparatus 100 can vary according different states, and different sequences, of Q1, Q2, Q3, Q4 (see FIG. 1A and FIG. 1B). The example shown in FIG. 3 is an example where controller 120 is operating Q1. Q2, Q3, Q4 under sequence A that has a repetitive sequence of states S42, S21, S31, S21.

In the example shown in FIG. 3, at a time 302, VLX can be at a voltage level between GND and Vin/2, hence VLX is less than Vin/2 at time 302. A discharge state, or state S31, can begin at time 302 and complete at a time 304. In response to completing state S31 at time 304, VLX is further reduced to a lower voltage level when compared to VLX at time 302. In response to completion of state S31 at time 304, circuit 102 in FIG. 1A can measure VLX at time 304 and compare the measured VLX with reference voltage Vref (see FIG. 1A). At time 304, the comparison of VLX with reference voltage Vref can result in indication 105 (see FIG. 1A) indicating VLX is less than Vref, or Vin/2. Note that in the discharge state S31, VLX is equivalent to $V_{Cfly}$, hence $V_{Cfly}$ is lower than Vin/2 at time 302, and remains lower than Vin/2 at time 304. Controller 120 can read indication 105 and in response to VLX being less than Vref, insert a charge state S42 that begins at a time 306.

The charge state S42 that began at time 306 can complete at a time 308. At time 308, the comparison of VLX with reference voltage Vref can result in indication 105 indicating VLX is greater than Vref, or Vin/2. Note that in the charge state S42, VLX is equivalent to Vin-$V_{Cfly}$, thus as the charge state S42 progress from time 306 to time 308, VLX can decrease and $V_{Cfly}$ can increase. Controller 120 can read indication 105 and in response to VLX being greater than Vref, depart from sequence A and insert another charge state S42 that begins at a time 310. Under sequence A, a discharge state S42 would have begun at time 310 but since indication 105 outputted from circuit 102 indicates VLX is greater than Vref (or $V_{Cfly}$ is less than Vin/2), controller 120 departs from sequence A and insert another charge state S42 at time 310 to further charge Cfly.

The charge state S42 that began at time 310 can complete at a time 312. At time 312, the comparison of VLX with reference voltage Vref can result in indication 105 indicating VLX is less than Vref, or Vin/2. Note that in the charge state S42, VLX is equivalent to Vin-$V_{cfly}$, thus as the charge state S42 progress from time 310 to time 312, VLX can decrease and VCfly can increase. Controller 120 can read indication 105 and in response to VLX being less than Vref, insert a discharge state S31 that begins at a time 314 to discharge Cfly. The discharge state S31 that began at time 314 can complete at a time 316. At time 316, the comparison of VLX with reference voltage Vref can result in indication 105 indicating VLX is less than Vref, or Vin/2. Note that in the discharge state S31. VLX is equivalent to $V_{cfly}$, hence $V_{cfly}$ is lower than Vin/2 at time 302, and remains lower than Vin/2 at time 316. Controller 120 can read indication 105 and in response to VLX being less than Vref, perform a charge state S42 that begins at a time 318.

Circuit 102 can continue to monitor and compare VLX with Vref at completion of every charge state S42 and every discharge state S31. In the example shown in FIG. 3, controller 120 departs from sequence A at time 310 and resume sequence A at time 314. Further, the time intervals or time durations of each charge and discharge state are identical and remain unchanged. Thus, $V_{cfly}$ can be maintained or balanced by having controller 120 insert charge or discharge states, instead of having to perform calculations of timing offsets and adjusting PWM signals to modify charge state or discharge state durations.

Therefore, if VLX is greater than Vref after completing a discharge state, controller 120 can insert discharge state S31 to further discharge Cfly. If VLX is greater than Vref after completing a charge state, controller 120 can insert charge state S42 to further charge Cfly. If VLX is less than Vref after completing a discharge state, controller 120 can insert charge state S42 to charge Cfly. If VLX is less than Vref after completing a charge state, controller 120 can insert discharge state S31 to discharge Cfly.

FIG. 4 is an example diagram illustrating a condition for implementing flying capacitor balancing for multi-level voltage converters in one embodiment. In an example shown in FIG. 4, switch node voltage VLX of apparatus 100 can vary according different states, and different sequences, of Q1, Q2, Q3, Q4 (see FIG. 1A and FIG. 1B). In the example shown in FIG. 4, if $V_{cfly}$ is maintained within a voltage window that ranges from Vref-ΔV (e.g., lower bound value) to Vref+ΔV (e.g., upper bound value), controller 120 can operate Q1, Q2, Q3, Q4 under sequence A that has a repetitive sequence of states S42, S21, S31, S21. The voltage offset ΔV is a fixed voltage change of $V_{Cfly}$ after a charge state or a discharge state.

If $V_{cfly}$ is within the voltage window ranging from Vref−ΔV to Vref+ΔV, or if it is equivalent to one of the upper bound value and the lower bound value, then controller 120 can continue to operate multi-level voltage converter 104 under sequence A. If Vcfly falls outside of the voltage window at a completion of a charge state or a discharge state, then circuit 102 can output indication 105 to indicate that Vcfly has fallen out of the voltage window. Controller 120 can read indication 105 and based on the completed state, repeat either a charge state or a discharge state to adjust Vcfly to move back within the voltage window.

A net effect of the alternating charge and discharge states can keep the flying capacitor voltage $V_{Cfly}$ balanced at Vref. By way of example, at time 404, flying capacitor voltage VCfly is VCflyA and switch voltage VLX is Vin-VCflyA. During the charge state S42 that began at time 404, VCfly can increase by ΔV and switch voltage VLX can decrease by ΔV. At time 406, switch voltage on VLX is VCflyA-ΔV. If VCflyA-ΔV is less than Vref, then the next state after state S21, that begins at time 408, will be a discharge state, S31. The maximum flying capacitor voltage VCfly for standard switching (e.g., sequence 110) can be Vin-Vref-AV. If the flying capacitor voltage VCfly is less than this value, then the charge state S42 will repeat until VCfly>Vin−Vref−ΔV.

At time 408, the flying capacitor voltage VCfly and switch voltage VLX is equal to VCflyB. During the discharge state S31 that began at time 408, switch voltage VLX can decrease by ΔV and at time 410, switch voltage VLX is VCflyB-ΔV. If this voltage is less than Vref, then the next state after the state S21 that began at time 410 will be a charge state S42. The minimum VCfly for standard switching (e.g., sequence 110) can be VCfly<Vref+ΔV. If the flying capacitor voltage VCfly is higher than this value, then discharge state S31 will repeat until VCfly<Vref+ΔV.

Therefore, in the example shown in FIG. 4, controller 120 controls Q1, Q2, Q3, Q4 according sequence A as long as Vref-ΔV<$V_{Cfly}$<Vref+ΔV and Vref=Vin/2. If $V_{Cfly}$>Vref+ΔV, then the discharge state will repeat and $V_{Cfly}$ will be reduced by ΔV. If $V_{Cfly}$<Vref+ΔV, then the charge state will be repeated and VCfly will increase by ΔV. If the reference voltage Vref is set to Vin/2, then a condition for standard switching (e.g., sequence 110 in FIG. 1) is given by Vin/2−ΔV<VCfly<Vin/2+ΔV. This condition can allow circuit 102 in controller 120 to operate as a window comparator around the desired voltage, Vin/2. If this condition is met, then charge and discharge states will alternate and the flying capacitor voltage can remain relatively stable.

Figure 5:
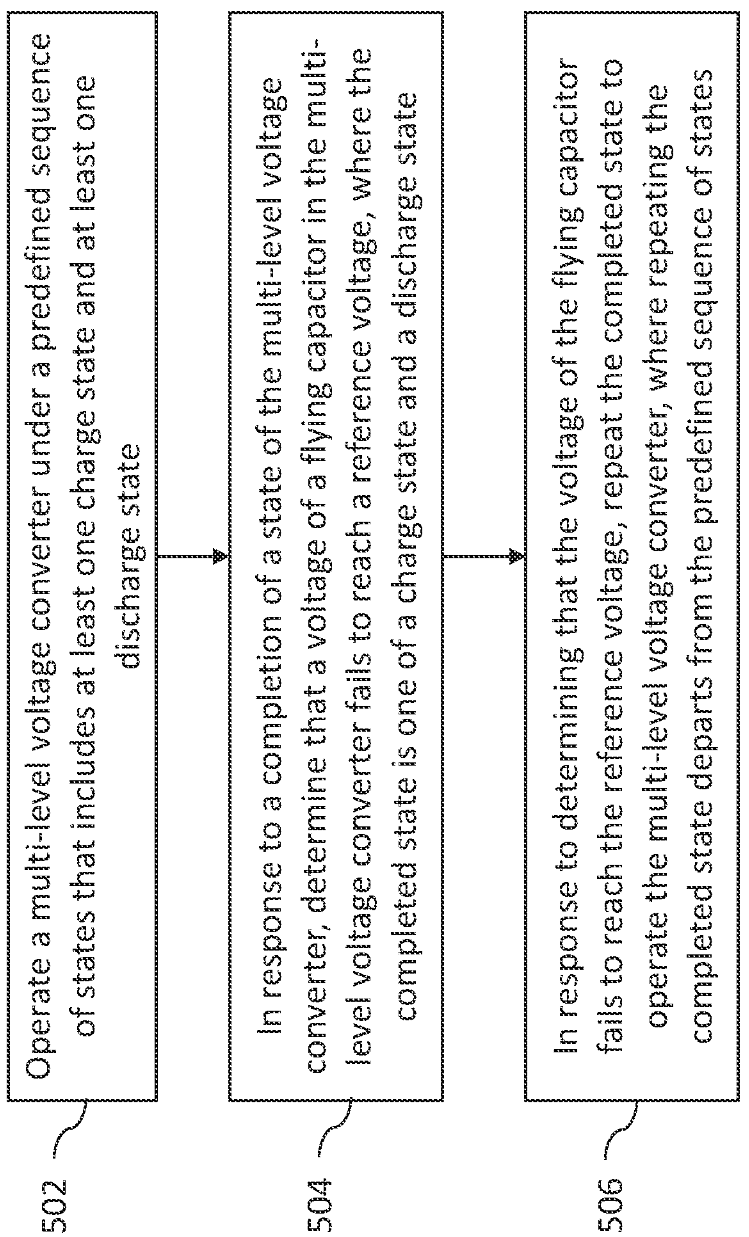
FIG. 5 is a flow diagram illustrating a process to implement flying capacitor balancing for multi-level voltage converters in one embodiment.

FIG. 5 is a flow diagram illustrating a process to implement flying capacitor balancing for multi-level voltage converters in one embodiment. The process can include one or more operations, actions, or functions as illustrated by one or more of blocks 502, 504, and/or 506. Although illustrated as discrete blocks, various blocks can be divided into additional blocks, combined into fewer blocks, eliminated, performed in different order, or performed in parallel, depending on the desired implementation.

Process 500 can be performed by a controller that operates a multi-level voltage converter (e.g., controller 120 described herein). Process 500 can begin at block 502. At block 502, the controller can operate a multi-level voltage converter under a predefined sequence of states that includes at least one charge state and at least one discharge state.

Process 500 can proceed from block 502 to block 504. At block 504, the controller can, in response to a completion of a state of the multi-level voltage converter, determine that a voltage of a flying capacitor in the multi-level voltage converter fails to reach a reference voltage. The completed state can be one of a charge state and a discharge state. In one embodiment, the controller can compare a switch node voltage of the multi-level voltage converter with the reference voltage to determine the voltage of the flying capacitor fails to reach the reference voltage.

Process 500 can proceed from block 504 to block 506. At block 506, the controller can, in response to determining that the voltage of the flying capacitor fails to reach the reference voltage, repeat the completed state to operate the multi-level voltage converter. The repeating of the completed state can depart from the predefined sequence of states.

In one embodiment, the completed state can a charge state that charges the flying capacitor. The controller can determine the voltage of the flying capacitor is less than the reference voltage. In response to the voltage of the flying capacitor being less than the reference voltage, the controller can repeat the charge state to continue charging the flying capacitor.

In one embodiment, the completed state can be a discharge state that charges the flying capacitor. The controller can determine the voltage of the flying capacitor is greater than the reference voltage. In response to the voltage of the flying capacitor being greater than the reference voltage, the controller can repeat the discharge state to continue discharging the flying capacitor.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:

a circuit configured to sense a switch node voltage in a multi-level voltage converter to generate an indication that indicates whether a voltage of a flying capacitor in the multi-level voltage converter reaches a reference voltage or fails to reach the reference voltage, wherein the switch node voltage is being sensed during switching operations of the multi-level voltage converter; and a controller configured to:

in response to a completion of a state of the multi-level voltage converter, read the indication being outputted by the circuit, wherein the state is one of a charge state and a discharge state during the switching operations of the multi-level voltage converter; and in response to the indication indicating the voltage of the flying capacitor fails to reach the reference voltage, repeat the completed state during the switching operations to operate the multi-level voltage converter.

2. The semiconductor device of claim 1, wherein:

the controller is configured to operate the multi-level voltage converter under a predefined sequence of states that includes at least one charge state and at least one discharge state; and repeat of the completed state departs from the predefined sequence of states.

3. The semiconductor device of claim 1, wherein the circuit is configured to compare the switch node voltage of the multi-level voltage converter with the reference voltage to determine whether the voltage of the flying capacitor reaches the reference voltage or fails to reach the reference voltage.

4. The semiconductor device of claim 1, wherein the multi-level voltage converter is configured to output at least three different voltages.

5. The semiconductor device of claim 1, wherein:

the multi-level voltage converter is a three-level voltage converter; and the reference voltage is half of an input voltage being provided to the multi-level voltage converter.

6. The semiconductor device of claim 1, wherein:

the completed state is a charge state that charges the flying capacitor;

the indication indicates the voltage of the flying capacitor is less than the reference voltage; and the controller is configured to, in response to the indication indicating the voltage of the flying capacitor is less than the reference voltage, repeat the charge state to operate the multi-level voltage converter.

7. The semiconductor device of claim 1, wherein:

the completed state is a discharge state that discharges the flying capacitor;

the indication indicates the voltage of a flying capacitor is greater than the reference voltage; and the controller is configured to, in response to the indication indicating the voltage of the flying capacitor is greater than the reference voltage, repeat the discharge state to operate the multi-level voltage converter.

8. The semiconductor device of claim 1, wherein a duration of the completed state and a duration of the repeated state are equivalent.

9. A system comprising:

a multi-level voltage converter including a flying capacitor;

a controller configured to:

sense a switch node voltage in the multi-level voltage converter to generate an indication that indicates whether a voltage of the flying capacitor reaches a reference voltage or fails to reach the reference voltage, wherein the switch node voltage is being sensed during switching operations of the multi-level voltage converter;

in response to a completion of a state of the multi-level voltage converter, determine whether the voltage of the flying capacitor reaches the reference voltage or fails to reach the reference voltage, wherein the completed state is one of a charge state and a discharge state during the switching operations of the multi-level voltage converter; and in response to a determination that the flying capacitor fails to reach the reference voltage, repeat the completed state during the switching operations to operate the multi-level voltage converter.

10. The system of claim 9, wherein:

the controller is configured to operate the multi-level voltage converter under a predefined sequence of states that includes at least one charge state and at least one discharge state; and the repeat of the completed state departs from the predefined sequence of states.

11. The system of claim 9, wherein the controller is configured to compare the switch node voltage of the multi-level voltage converter with the reference voltage to determine whether the voltage of the flying capacitor reaches the reference voltage or fails to reach the reference voltage.

12. The system of claim 9, wherein the multi-level voltage converter is configured to output at least three different voltages.

13. The system of claim 9, wherein:

the multi-level voltage converter is a three-level voltage converter; and the reference voltage is half of an input voltage being provided to the multi-level voltage converter.

14. The system of claim 9, wherein:

the completed state is a charge state that charges the flying capacitor;

the voltage of the flying capacitor is less than the reference voltage; and the controller is configured to, in response to the voltage of the flying capacitor being less than the reference voltage, repeat the charge state to operate the multi-level voltage converter.

15. The system of claim 9, wherein:

the completed state is a discharge state that discharges the flying capacitor;

the voltage of the flying capacitor is greater than the reference voltage; and the controller is configured to, in response to the voltage of the flying capacitor being greater than the reference voltage, repeat the discharge state to operate the multi-level voltage converter.

16. The system of claim 9, wherein a duration of the completed state and a duration of the repeated state are equivalent.

17. A method for operating a multi-level voltage converter, the method comprising:

operating a multi-level voltage converter under a predefined sequence of states that includes at least one charge state and at least one discharge state;

sensing a switch node voltage in the multi-level voltage converter during switching operations of the multi-level voltage converter;

generating an indication that indicates whether a voltage of a flying capacitor in the multi-level voltage converter reaches a reference voltage or fails to reach the reference voltage;

in response to a completion of a state of the multi-level voltage converter, determining, based on the indication, that a voltage of the flying capacitor in the multi-level voltage converter fails to reach a reference voltage, wherein the completed state is one of a charge state and a discharge state during the switching operations of the multi-level voltage converter; and in response to determining that the voltage of the flying capacitor fails to reach the reference voltage, repeating the completed state during the switching operations to operate the multi-level voltage converter, wherein repeating the completed state departs from the predefined sequence of states.

18. The method of claim 17, wherein determining the voltage of the flying capacitor fails to reach the reference voltage comprises comparing the switch node voltage of the multi-level voltage converter with the reference voltage.

19. The method of claim 17, wherein:

the completed state is a charge state that charges the flying capacitor;

determining the voltage of the flying capacitor fails to reach the reference voltage comprises determining that the voltage of the flying capacitor is less than the reference voltage; and in response to the voltage of the flying capacitor being less than the reference voltage, repeating the charge state to continue charging the flying capacitor.

20. The method of claim 17, wherein:

the completed state is a discharge state that charges the flying capacitor;

determining the voltage of the flying capacitor fails to reach the reference voltage comprises determining that the voltage of the flying capacitor is greater than the reference voltage; and in response to the voltage of the flying capacitor being greater than the reference voltage, repeating the discharge state to continue discharging the flying capacitor.

* * * * *